S. J. ALLEN.
SNOW PLOW.
APPLICATION FILED JUNE 4, 1914.
1,158,766.
Patented Nov. 2, 1915.
2 SHEETS—SHEET 1
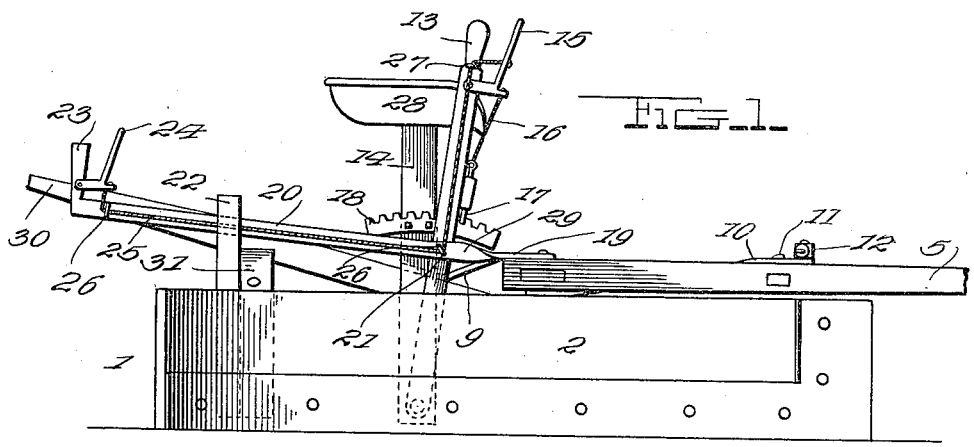
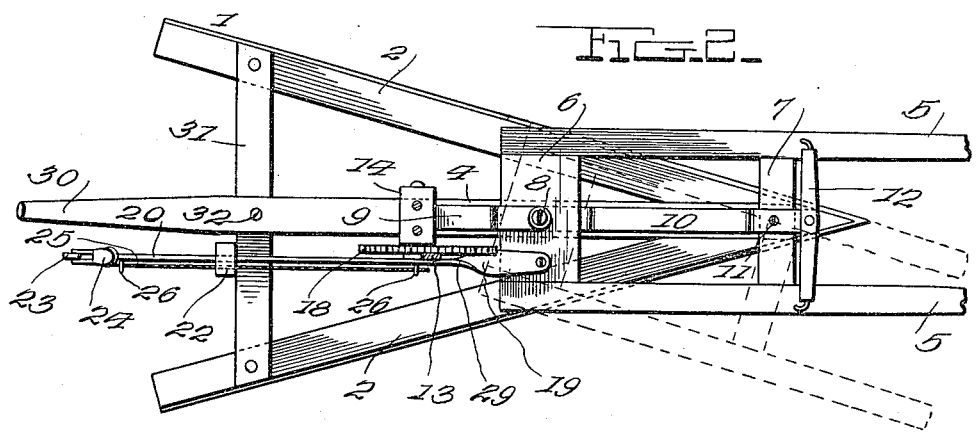
Inventor
Samuel J. Allen.
Witnesses

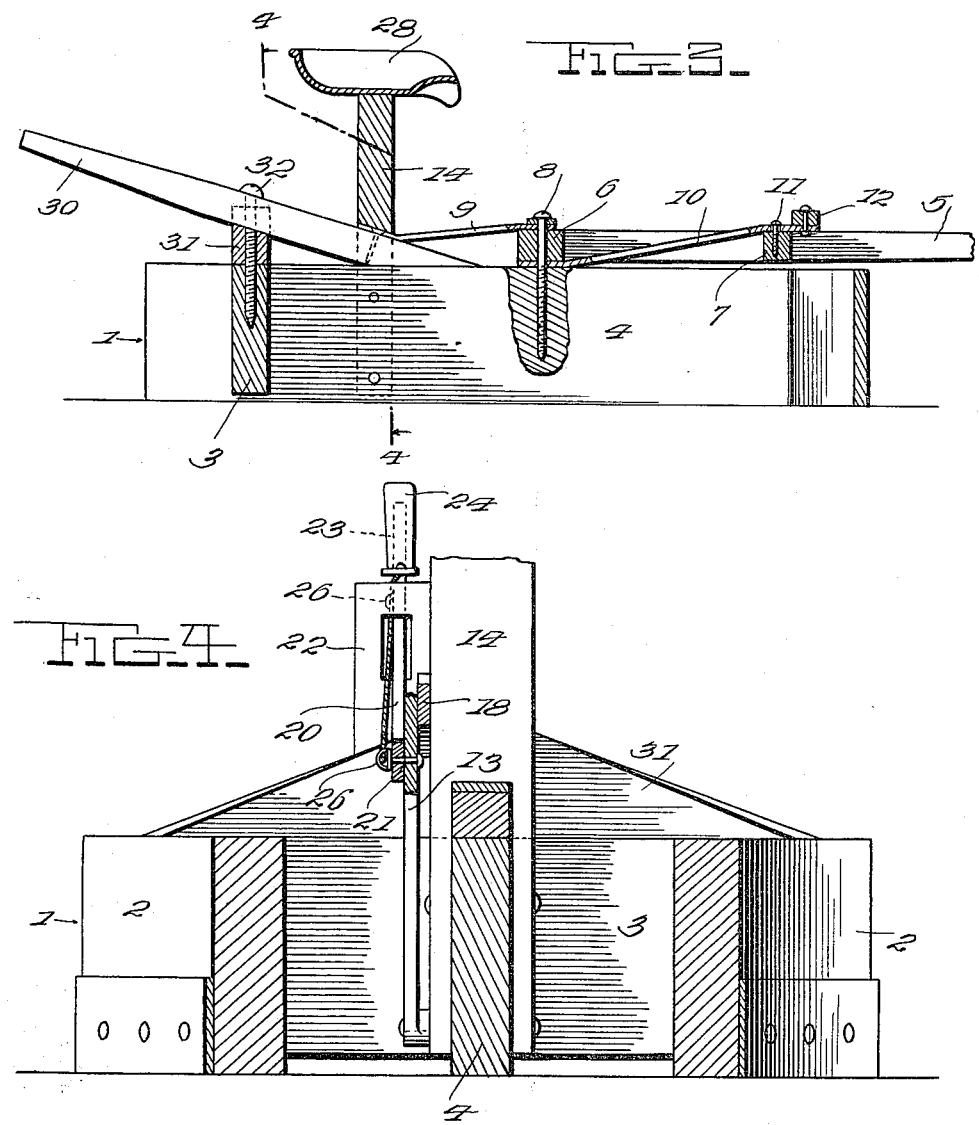

UNITED STATES PATENT OFFICE.

SAMUEL J. ALLEN, OF KINMUNDY, ILLINOIS.

SNOW-PLOW.

1,158,766.      Specification of Letters Patent.      Patented Nov. 2, 1915.

Application filed June 4, 1914. Serial No. 843,085.

*To all whom it may concern:*

Be it known that I, SAMUEL J. ALLEN, a citizen of the United States, residing at Kinmundy, in the county of Marion and State of Illinois, have invented certain new and useful Improvements in Snow-Plows; and I do declare the following to be a full, clear, and exact description of the invention, such as will enable others skilled in the art to which it appertains to make and use the same.

My invention relates to improvements in snow plows and has for its primary object to provide a device of this character which may be used to great advantage for the purpose of deflecting a body of snow to the right, to the left or to both right and left, from a sidewalk or other surface.

In carrying out the above end, I provide a plow, a draft beam pivoted thereto to swing in a lateral plane, a lever pivoted to the plow and adapted to swing said beam, a rearwardly extending operating bar attached at its forward end to said lever, and means controllable from the lever and from the rear end of said bar for locking the lever in adjusted position.

A secondary object of the invention is to provide simple and efficient means for releasing the locking means either from the lever or from the rear end of said operating bar.

A further object of the invention is to provide a flexible operating link between the lever and the draft beam, whereby movement of the two in intersecting planes, is allowed.

A still further object of the invention is to construct the lever operating bar and the flexible link of a single metal bar.

Still other objects of the invention are to provide simple and efficient means for relieving the draft bar of unnecessary strain and to construct the entire device in a comparatively simple yet extremely efficient manner.

With these objects in view, the invention resides in certain novel features of construction and combination herein described and claimed and shown in the drawings wherein:—

Figure 1 is a side elevation of a snow plow constructed in accordance with my invention; Fig. 2 is a top plan view thereof, the draft device being swung to one side in dotted lines; Fig. 3 is a longitudinal sectional view; and Fig. 4 is a transverse section taken along the plane of the line 4—4 of Fig. 3.

In the accompanying drawings, I have shown my invention as comprising an A-shaped plow 1, the latter including a pair of forwardly converging side members 2, a transverse connecting bar 3 near the rear ends of said members 2, a centrally disposed longitudinal bar or member 4 which is secured between the forward ends of the members 2 and has its rear end rigidly secured to the cross bar 3. As is usual with devices of this character, the active surfaces of the members 2 are preferably provided with metal wear plates.

Pivoted near the front portion of the plow 1 is a draft appliance in the form of a pair of thills 5 which are connected at their rear ends by a transverse bar or block 6 while a second transverse bar 7 is disposed forward thereof. As clearly shown in the drawings, the rear cross bar 6 is pivotally connected as indicated at 8 to the central member 4, said pivot being here shown in the form of a screw which passes through a bracing plate 9 overlying the cross bar 6 through said bar and through the rear end of a draft bar 10, said rear end being interposed between the under side of the block 6 and the member 4. The forward portion of the bar 10 inclines upwardly and forwardly and is rigidly secured at 11 to the front cross bar 7, said bar terminating a suitable distance forward of said last mentioned bar and constituting a pivotal support for a swingle tree 12. By the provision of the draft bar 10 it will be seen that the thills proper and their transverse bars are relieved of unnecessary strain which latter is exerted directly upon the pivot 8.

In order that the thills 5 may be swung laterally either from the forward portion of the machine or from the rear end thereof, I provide the following means: An upright lever 13 is pivoted at its lower end to one side of a bifurcated seat standard or post 14, said bifurcated end straddling the central member 4 and being secured in any suitable manner to the opposite sides thereof. The lever 13 rises a suitable distance and is provided with an L-shaped thumb lever 15 which, through the instrumentality of a link 16, is adapted to retract a dog or pawl 17 from engagement with a segmental rack 18 which is rigidly secured upon the plow. It will therefore be seen that the lever may be swung around its pivot when the pawl 17 is retracted, thus allowing the thills to be swung laterally through the instrumentality of a flexible link 19 which is pivotally connected to the lever 13 and to one end of the bar 6.

As clearly shown in the various figures of the drawings, the link 19 is formed integrally with the forward end of a lever operating bar 20, the latter being pivoted to the lever 13 as shown at 21 and extending rearwardly from its pivot and passing loosely through an upright guide 22, the rear end of said lever being formed with an operating handle 23 to which an L-shaped thumb lever 24 is pivoted, said thumb lever being adapted to retract the dog or pawl 17 when rocked around its pivot, this being allowed by the provision of a cable or wire 25 which passes slidably through a number of guides 26 on the bar 20 and through a guide 27 which is disposed adjacent the thumb lever 15 to which the opposite end of said cable or wire is attached. It will therefore be seen that movement of either of the thumb levers 15 or 24 will retract the dog or pawl 17 thus allowing the lever 13 to be rocked around its pivot by a person riding upon a seat 28, carried by the standard 14, or by a person walking in rear of the machine.

It will be further noted by reference to the drawings, that the flexibility of the link 19 is imparted thereto by giving the same a quarter turn as indicated at 29, thus allowing said link to yield both vertically and laterally as the lever 13 and the draft appliance move around their pivots in intersecting planes.

As before suggested, it becomes necessary at times for the operator to walk in rear of the machine, from which he may not only control the relation of the thills with the plow but may steer the latter to a certain extent by means of a central steering handle 30 which latter is secured to the central member 4 at its forward end while its intermediate portion is supported by a spacing block 31 which overlies the upper edges of the side members 1 and the rear cross bar 3, a fastening screw 32 passing through said handle and the spacing block and into said cross bar.

From the foregoing description taken in connection with the accompanying drawings, it will be seen that the relation of the thills to the plow may be varied, thus causing the latter to deflect the body of snow in any desired direction.

I have described my invention with considerable minuteness and have set forth certain specific embodiments for carrying out the objects of the invention. I wish it understood however, that I do not wish to be limited to details of construction other than those amplified in the appended claims.

Having thus described my invention what I claim as new and desire to secure by Letters Patent is:—

1. Means of the class described comprising a laterally swinging member operable in one plane, a lever operable in an intersecting plane, and a comparatively resilient bar pivoted near one end to said lever, said end being given a quarter turn and pivoted to the laterally swinging member, the other end of said bar being disposed at a point remote from the lever, whereby a supplemental lever operating device and a yielding connection between the lever and the aforesaid member are provided.

2. A device of the class described comprising a pair of spaced thills, a rear cross bar connecting the rear ends thereof, a front cross bar spaced in advance of the rear bar, a draft bar having its rear end disposed beneath the rear cross bar and its front end disposed above and extended forwardly from the front cross bar, a pivot passing through the rear cross bar and through the rear end of the draft bar, means securing said draft bar to the front cross bar, and a tree pivoted to the projecting front end of said draft bar.

In testimony whereof I have hereunto set my hand in presence of two subscribing witnesses.

SAMUEL J. ALLEN.

Witnesses:
S. L. BUNDY,
GEO. R. TOMLINSON.

Copies of this patent may be obtained for five cents each, by addressing the "Commissioner of Patents, Washington, D. C."